Oct. 13, 1942.    B. W. MAHONEY    2,298,828
ELECTRIC SWITCHGEAR
Filed June 4, 1940    2 Sheets-Sheet 1
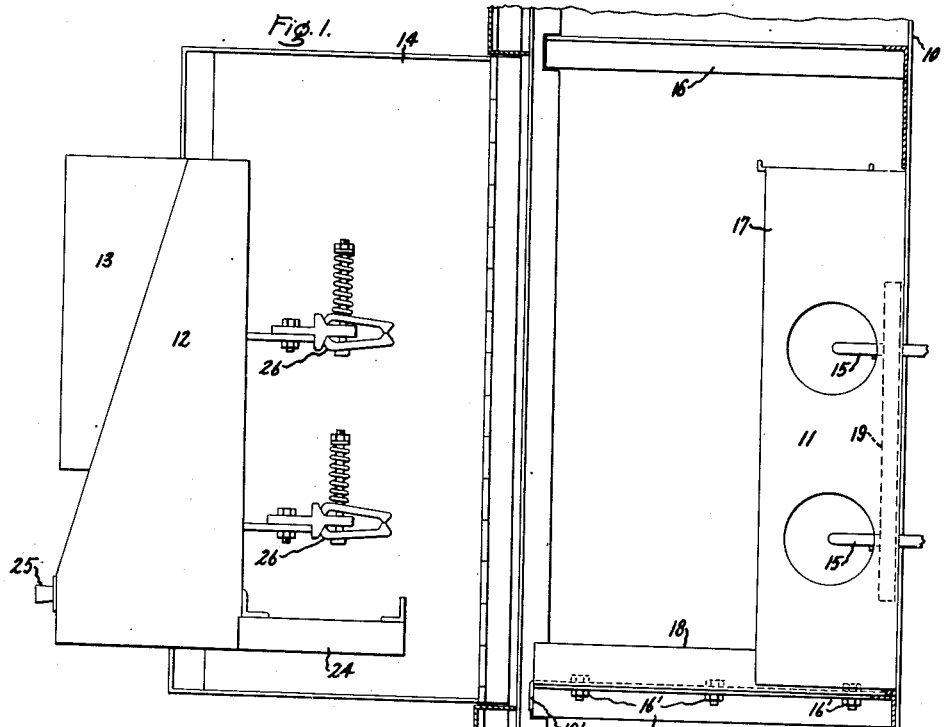
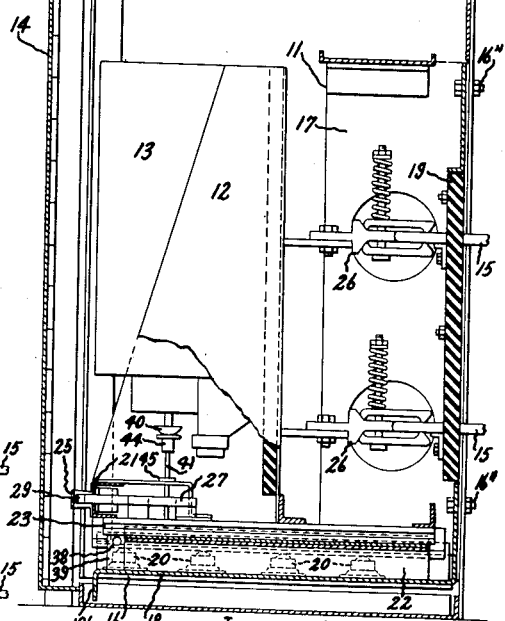
Inventor:
Bertram W. Mahoney,
by Harry E. Dunham
His Attorney.

Oct. 13, 1942.   B. W. MAHONEY   2,298,828
ELECTRIC SWITCHGEAR
Filed June 4, 1940   2 Sheets-Sheet 2
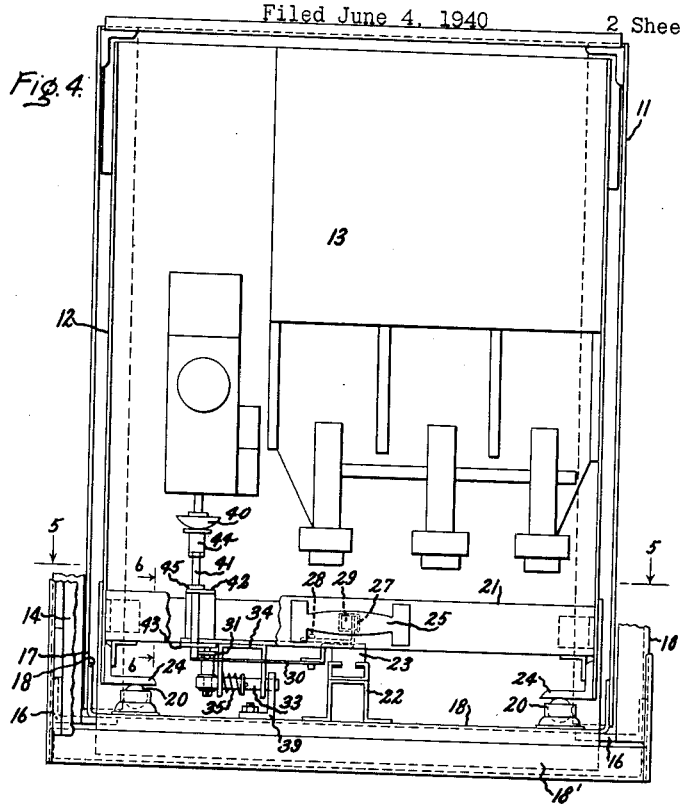
Fig. 4.
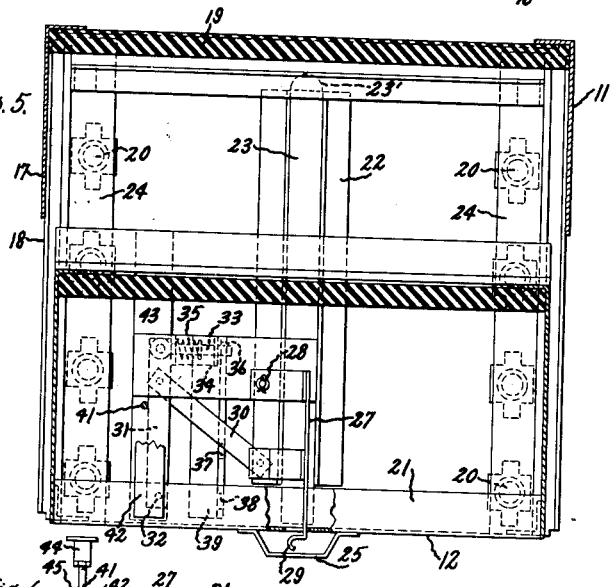
Fig. 5.
Fig. 6.
Inventor:
Bertram W. Mahoney,
by Harry E. Dunham
His Attorney.

Patented Oct. 13, 1942

2,298,828

UNITED STATES PATENT OFFICE 2,298,828

ELECTRIC SWITCHGEAR

Bertram W. Mahoney, Drexel Hill, Pa., assignor to General Electric Company, a corporation of New York Application June 4, 1940, Serial No. 338,750

6 Claims. (Cl. 175—298)

My invention relates to electric switchgear and more particularly to metal-enclosed switchgear of the draw-out type.

In metal-enclosed switchgear of the draw-out type, the conventional arrangement comprises a stationary metal housing within which bus bars, cable leads, and accessory apparatus are disposed and a removable unit comprising a circuit breaker which is suitably connected to the busses and incoming or outgoing leads in the operative position of the unit. In this position, so-called primary disconnecting contacts comprising contacts connected to the busses and incoming or outgoing leads and fixedly mounted with respect to the stationary housing and coacting movable contacts carried by the removable unit are in engagement. The apparatus is also provided with suitable interlocking means generally arranged so that it is impossible to insert or withdraw the removable unit or break connection at the primary disconnecting contacts without first tripping the circuit breaker, and insuring that the circuit breaker is open both when the unit is moved out of and into operative position. Switchgear of the draw-out type is usually adapted to assume a plurality of positions in the metal-enclosed housing, one of which is a test position when the primary disconnecting contacts are disengaged and another a circuit-controlling position when the primary disconnecting contacts are engaged. In the former position, the operation of the circuit breaker may be tested.

In order to obtain proper engagement of the primary disconnecting contacts, it is essential in draw-out type switchgear that the movable and stationary parts of such contacts are properly aligned as the removable unit including the circuit breaker moves into position. This has heretofore necessitated the accurate alignment of the movable structure with respect to the stationary structure, the obtaining of which required accurate or precision machining which was very costly. Inasmuch as the metal enclosure and the removable unit are relatively large structures and ordinarily constructed somewhat roughly as compared with more delicate electrical devices, it was necessary heretofore to make adjustments on the primary disconnecting contacts when assembling the apparatus so that they would be in proper alignment. Furthermore, if a rack-out mechanism were provided, adjustments to such mechanism were also necessary in order that the parts associated with the metal enclosure and the movable unit would cooperate with one another properly. Such adjustments were often made under considerable difficulties due to the limited space within the stationary metal housing and this was particularly difficult when these adjustments had to be made at the place of installation where all the necessary tools and equipment might not be available.

In order to overcome such difficulties, various arrangements have been proposed, such as providing floating contacts for the disconnecting devices which would be self-aligning. However, all such proposals considerably complicate the apparatus and add to the cost thereof so as to be more or less unsatisfactory. It would be desirable to provide metal-enclosed switchgear of the draw-out type in which all adjustments of the primary disconnecting devices including the stationary portions thereof and the cooperating parts of the rack-out mechanism, if one is provided, could be made outside of the metal-enclosed housing.

Accordingly, it is an object of my invention to provide an improved metal-enclosed switchgear of the draw-out type, overcoming the disadvantages noted in connection with prior art devices, which is simple and rugged in construction and efficient and safe in operation.

It is another object of my invention to provide a new and improved metal-enclosed switchgear of the draw-out type in which all adjustments for aligning the contacts of the primary disconnecting devices including the stationary part thereof may be made prior to installation in the metal-enclosed unit.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Fig. 1 is a side elevation partly in section of a metal-enclosed switchgear including a plurality of units embodying my invention, Fig. 2 is an elevational view of the removable unit including the circuit breaker, Fig. 3 is a side elevation of an intermediate unit of my improved metal-enclosed electric switchgear including the stationary part of the primary disconnecting devices, Fig. 4 is a front elevational view of one unit of my metal-enclosed switchgear, Fig. 5 is a view taken on line 5—5 of Fig.

4, and Fig. 6 is a view taken on line 6—6 of Fig. 4.

Referring now to the drawings, I have illustrated in Fig. 1 a stationary housing 10 arranged in the form of a cubicle having sheet metal walls supported by a frame of angle members. This stationary housing 10 is constructed to accommodate a plurality of identical switching units mounted one above the other and, in Fig. 1, two such sections of housing 10 are shown. These switching units each comprise an intermediate unit 11, the purpose for which will be described in greater detail hereinafter, and a removable unit 12 comprising a circuit breaker and operating mechanism generally indicated at 13. The switching unit in the lower section of housing 10 is shown in the circuit-controlling position while the removable unit 12 for the upper section of housing 10 is shown just prior to being inserted in the metal enclosure in which it would engage with intermediate unit 11 so as to be horizontally movable into and out of housing 10. Each of the sections of housing 10 within which the switching units are mounted is provided with a suitable door 14.

For the purposes of clearness and simplicity in the drawings, the bus bars, cable leads, feeders, and accessory apparatus are omitted from the stationary housing 10. The intermediate units 11 support the stationary portions 15 of the primary disconnecting devices and are suitably mounted in housing 10 on angle irons 16 horizontally positioned along the side walls thereof. Preferably, intermediate units 11 are attached to these angle irons as by bolts 16' and may also be fastened to the back of housing 10 as by bolts 16". I have illustrated these intermediate units 11 as comprising a vertical portion 17 and a horizontal platform 18 suitably fastened together as by welding. Vertical portion 17 supports the stationary portion 15 of the primary disconnecting devices and may comprise a suitable vertically positioned insulating member 19 through which the stationary portions 15 of the primary disconnecting devices extend. Platform 18 is provided with a depending flange 18' at the front thereof which engages with angle irons 16, as shown best in Figs. 1 and 4, to determine the position of intermediate unit 11 in housing 10. On either side of platform 18 is provided a row of antifriction devices such as ball bearings 20 suitably mounted and arranged in a horizontal plane so that removable unit 12 may be slidably supported thereon.

The removable unit 12 of the switchgear is horizontally movable and includes a channel shaped member 21 and a pair of depending angle-iron supports 24, the latter arranged to slidably engage with ball bearings 20 so that removable unit 12 may be inserted or withdrawn in drawer fashion from housing 10. In order to prevent vertical movement of removable unit 12 relative to intermediate unit 11 and horizontal movement other than in a direction into and out of housing 10 as well as to hold angle-iron supports 24 in engagement with ball bearings 20, I provide a single, central, horizontal dovetail guide comprising member 22 suitably fastened to platform 18 of intermediate unit 11 and cooperating member 23 suitably fastened to removable unit 12. The end of cooperating member 23 adjacent the rear of housing 10, as shown in Fig. 5, is suitably rounded at 23' to facilitate engagement with member 22 of intermediate unit 11 when removable unit 12 is moved toward intermediate unit 11. By this arrangement, unit 12 is readily movable in a horizontal plane away from and toward intermediate unit 11. A suitable handle 25 is attached by any suitable means to the front edge of channel 21 of removable unit 12 to facilitate operation thereof.

As will be understood by those skilled in the art, the circuit breaker and operating mechanism therefor generally indicated at 13 are preferably supported in a vertical position on removable unit 12 by a suitable framework. This circuit breaker is electrically connected to contacts 26, which are hereinafter referred to as the movable portion of the primary disconnecting contacts since they are supported by removable unit 12 and are arranged to engage with the stationary portion 15 of these contacts supported by intermediate unit 11. While the stationary portions 15 of the primary disconnecting contacts are illustrated as of the male type adapted to engage with the spring-pressed jaws of female type contact 26 associated with the removable unit 12, it will, of course, be understood by those skilled in the art that contacts 15 and 26 making up the primary disconnecting devices may be constructed in any other suitable manner and the particular embodiment shown is only one of the many arrangements possible. The secondary or control connections for electrically operating the circuit breaker 13 are not shown but it will be understood by those skilled in the art that these connections are completed so that operation of the circuit breaker may be obtained in the test as well as in the operative position, as will be described in greater detail hereinafter.

Because of the resistance encountered between the cooperating contact members 15 and 26 of the primary disconnecting devices upon engagement or disengagement thereof, it may be desirable to provide a rack-out mechanism or force-multiplying means between intermediate unit 11 and removable unit 12. Such a rack-out mechanism is not shown in the drawing since it forms no part of the present invention but, in my copending application, Serial No. 321,709, filed March 1, 1940, and assigned to the same assignee as the present invention, there is disclosed and claimed a suitable rack-out mechanism which may be applied to the metal-enclosed switchgear of the draw-out type of the present invention.

The removable unit 12 is also provided with a locking device to prevent it from being rolled in or out beyond the proper limits and also to hold it in a plurality of positions, such as the test position, wherein the primary disconnecting contacts are disengaged so that the operation of the circuit breaker may be tested or the circuit-controlling position where the primary disconnecting contacts are engaged. This locking device, best shown in Figs. 4, 5, and 6, comprises a lever 27 pivotally mounted at 28 to removable unit 12 and provided with a manually operable catch lever 29 at one end thereof adjacent handle 25. Lever 27 is arranged to be connected by means of link 30 with lever 31 pivotally mounted to the roll-out unit at 32. The free end of lever 31 is provided with a pin 33 perpendicularly mounted with respect thereto and supported in a U-shaped member 34. A suitable spring 35 cooperating with pin 33 and U-shaped member 34 normally biases the pin end of lever 31 in a clockwise direction with reference to Fig. 5 so as to force pin 33 into one of a plurality of openings 36, 37, or 38 in a suitable angle-shaped stop member 39 fixedly mounted to platform 18 of intermediate unit 11. When pin 33 projects into opening 36, as shown in Figs. 5 and 6, removable unit 12 is in the circuit-controlling position with the primary disconnecting contacts engaged; when it projects into opening 37, the removable unit 12 is in the test position; and when it projects into opening 38, the roll-out shelf 21 is in its withdrawn position.

As will be understood by those skilled in the art, it is necessary to provide metal-enclosed switchgear of the draw-out type with suitable interlocking means so that it is impossible to insert or withdraw the removable unit or break connection at the primary disconnecting contacts without first tripping the circuit breaker and, furthermore, insuring that the circuit breaker is open both when the unit is moved out of and into operative position. I have illustrated my circuit breaker, generally indicated at 13, as provided with a manually operable trip knob or handle 40, upward movement of which causes tripping of circuit breaker 13. A circuit breaker provided with a manually operable handle for tripping purposes when moved upwardly is disclosed in United States Letters Patent to W. A. Atwood, 1,589,924, granted June 22, 1926, and assigned to the assignee of the present application.

In order to cause tripping of circuit breaker 13 prior to withdrawal of removable unit 12 and disengagement of primary disconnecting contacts 15 and 26, I provide a suitable interlocking means which cooperates with trip knob 40 and the locking device for removable unit 12 described above. I have illustrated this interlocking means as comprising a vertically movable pin 41 mounted directly below knob 40 so as to be movable in suitable openings provided in bracket members 42 and 43 supported on removable unit 12 by channel shaped member 21. The upper part of pin 41 adjacent knob 40 is provided with an enlargement 44 adjacent knob 40 to facilitate manual movement thereof. The lower end of pin 41 extends closely adjacent lever 31 when pin 33 is inserted in one of the openings 36, 37, or 38 of stop member 39. A suitable stop member 45 associated with pin 41 and cooperating with bracket 42 limits the downward movement of pin 41 so that the lower end thereof extends somewhat below lever 31. Referring to Figs. 5 and 6, it will be observed that pin 41 prevents movement of lever 31 in a counter-clockwise direction to allow withdrawal of pin 33 from opening 36 in stop 39. Therefore, removable unit 12 cannot be withdrawn with respect to intermediate unit 11 so as to cause disengagement of primary disconnecting contacts 15 and 26 unless pin 41 is moved upwardly to free lever 31. This upward movement of pin 41 will cause upward movement of knob 40 and consequent tripping of the circuit breaker. Furthermore, as long as lever 31 is moved to a position so that pin 33 is withdrawn from one of the openings 36, 37, or 38 in stop 39, pin 41 will rest on lever 31 in its raised position, holding trip knob 40 upwardly to insure that circuit breaker 13 remains in the open position.

The operation of the switchgear embodying my invention will be understood by those skilled in the art in view of the detailed description given above. Due to the provision of intermediate unit 11, the primary disconnecting contacts 15 and 26 may be adjusted in the factory so as to properly engage and disengage when removable unit 12 is moved in drawer fashion on ball bearings 20. Thereafter, when intermediate unit 11 is secured into housing 10, no further difficulties will be encountered in so far as the engagement of the primary disconnecting contacts is concerned or the operation of the rack-out mechanism if one is provided since the latter may also be adjusted in the factory with the removable unit 12 and the intermediate unit 11 removed from housing 10. Other parts of the intermediate unit which require adjustment with respect to the removable unit may also be adjusted at this time. Removable unit 12 is slidably mounted on ball bearings 20 supported by intermediate unit 11 and is held in proper position by means of dovetailed guides comprising members 22 and 23.

When it is desired to disengage the primary disconnecting contacts 15 and 26, the operator will grasp handle 44 of pin 41 and move it upwardly so that he is free to operate the catch lever 29 of the locking device. However, upward movement of pin 41 causes tripping of the circuit breaker 13 and movement to the left with reference to Fig. 5 of handle 29 will cause counter-clockwise rotation of lever 31 so that pin 41 is supported in its raised position by lever 31, thereby insuring the tripped position of circuit breaker 13 until pin 33 again engages with one of the openings 36, 37, or 38 of stop member 39. When pin 33 engages with opening 37, the circuit breaker is in the test position, that is, the primary disconnecting devices are disengaged although the secondary or control connections for electrically operating the circuit breaker 13, not shown, are still engaged so that the operation of the circuit breaker may be tested. When pin 33 engages with opening 38 of stop 39, removable unit 12 is completely withdrawn so that, not only are the primary disconnecting devices disengaged, but the secondary or control connections are also interrupted.

It will be understood by those skilled in the art that removable units 12 may be readily interchanged in so far as circuit breakers of similar capacity are concerned. By this arrangement, therefore, one type of intermediate unit and metal enclosure may be used interchangeably with removable units including circuit breakers of similar interrupting capacity.

While I have shown and described a particular embodiment of my invention, I do not desire my invention to be limited to the construction shown and described for it will, of course, be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. A switchgear of the type including a stationary housing, a separate intermediate unit arranged to be supported in said housing, a movable structure including a circuit breaker mounted thereon arranged to be moved horizontally in drawer fashion toward and away from said intermediate unit, primary disconnecting devices having cooperating members carried by said intermediate unit and said movable structure, said intermediate unit and removable structure being so constructed and arranged that all features of the stationary housing such as said primary disconnecting devices which require adjustment with respect to the movable structure may be adjusted prior to installation of said intermediate unit in said housing.

2. In an electric switchgear, the combination comprising a stationary housing, a separate intermediate unit arranged to be supported in said housing, a structure, including a circuit breaker, horizontally movable on means supported by said intermediate unit, primary disconnecting devices having cooperating members carried by said intermediate unit and said movable structure, a locking device for holding said movable structure in a plurality of predetermined positions relative to said intermediate unit, and means cooperating with said locking device for causing tripping of said circuit breaker whenever relative movement between said movable structure and intermediate unit occurs.

3. In an electric switchgear, the combination comprising a stationary housing, a separate intermediate unit arranged to be supported in said housing, a movable structure including a circuit breaker mounted thereon arranged to be moved horizontally on means supported by said intermediate unit, a dovetailed guide for holding said movable structure in position during movement away from and toward said intermediate unit, primary disconnecting devices having cooperating members carried by said intermediate unit and said movable structure, a locking device for holding said movable structure in at least two predetermined positions relative to said intermediate unit, and means cooperating with said locking device for causing tripping of said circuit breaker when said primary disconnecting devices are being engaged or disengaged.

4. A switchgear of the type including a stationary housing, a separate intermediate unit arranged to be supported in said housing, a horizontally movable structure arranged to be mounted on antifriction means supported by said intermediate unit and including a circuit breaker mounted thereon, primary disconnecting devices having cooperating members carried by said intermediate unit and said movable structure, said intermediate unit and said movable structure being so constructed and arranged that said primary disconnecting devices may be adjusted for proper engagement and disengagement prior to installation of said intermediate unit in said housing.

5. A switchgear of the type including a stationary housing, a separate intermediate unit arranged to be supported in said housing, a removable unit arranged to be supported for horizontal movement by said intermediate unit and including a circuit breaker mounted thereon, said circuit breaker including a vertically movable trip member, primary disconnecting devices having cooperating members carried by said intermediate unit and said removable unit, a locking device for holding said removable unit in at least two predetermined positions relative to said intermediate unit, and vertically movable means cooperating with said locking device and engageable with said trip member to insure the tripped condition of said circuit breaker when said primary disconnecting devices are being engaged or disengaged.

6. In an electric switchgear, the combination comprising a stationary housing, a movable structure including a circuit breaker mounted thereon arranged to be moved horizontally into and out of said housing, a dovetailed guide for holding said movable structure in position relative to said stationary housing during movement away from and toward said stationary housing, primary disconnecting devices having cooperating members carried by said stationary housing and said movable structure, a locking device for holding said movable structure in a predetermined position relative to said stationary housing, and means cooperating with said locking device for causing tripping of said circuit breaker when said primary disconnecting devices are being engaged or disengaged.

BERTRAM W. MAHONEY.